(12) United States Patent
Woods et al.

(10) Patent No.: US 7,543,128 B2
(45) Date of Patent: Jun. 2, 2009

(54) METHOD AND APPARATUS FOR REPURPOSING COMPUTE RESOURCES TO IMPLEMENT, OR NOT IMPLEMENT, STORAGE ACCESS PROTOCOLS

(75) Inventors: Harold Woods, Fort Collins, CO (US); Douglas L. Voigt, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 208 days.

(21) Appl. No.: 11/493,389

(22) Filed: Jul. 25, 2006

(65) Prior Publication Data

US 2008/0028163 A1    Jan. 31, 2008

(51) Int. Cl.
*G06F 12/00* (2006.01)
*G06F 13/00* (2006.01)
*G06F 13/28* (2006.01)

(52) U.S. Cl. .................. 711/170; 710/74; 709/201; 711/147

(58) Field of Classification Search ............. 711/170, 711/147; 709/201; 710/74
See application file for complete search history.

(56) References Cited

U.S. PATENT DOCUMENTS

| | | | | |
|---|---|---|---|---|
| 5,564,037 | A * | 10/1996 | Lam ........................... | 711/161 |
| 6,745,207 | B2 * | 6/2004 | Reuter et al. ................ | 707/200 |
| 6,779,063 | B2 * | 8/2004 | Yamamoto ................... | 710/74 |
| 7,117,118 | B2 * | 10/2006 | Kalos et al. ................. | 702/179 |
| 2004/0044846 | A1 * | 3/2004 | Matthews et al. ........... | 711/113 |
| 2004/0078466 | A1 * | 4/2004 | Coates et al. ............... | 709/226 |
| 2006/0112247 | A1 * | 5/2006 | Ramany et al. .............. | 711/165 |

OTHER PUBLICATIONS

Campanotti; "Choosing a STorage Management System for Broadcast"; Prism Business Media Inc.; May 1, 2006; 6 pp.
Liu, et al.; "Adaptive Entitlement Control of Resource Containers on Shared Servers"; Hewlett-Packard Company; Oct. 14, 2004; 17 pp.
Singhal, et al.; "Quartermaster—A Resource Utility System"; Hewlett-Packard Company; Sep. 9, 2004; 13 pp.
Villars; "New Options for Managing Tiers of Storage in the Enterprise: The Role of the Networked Storage Controller"; IDC; Jan. 2005; 15 pp.
"Information Lifecycle Management Technical Overview"; Hewlett-Packard Development Company, LP; Jan. 2004; 28 pp.
"iSCSI—Unified Network Storage Increases the Cost-Effeictiveness of the Distributed Information Value Chain"; Adaptec, Inc.; Jan. 2005; 4 pp.
Chandler; "The Strategic Role of Services in Application Optimized Storage Solutions"; IDC; Oct. 2005; 11 pp.
Takahashi, et al.; "Hitachi TagmaStore(TM) Universal Storage Platform"; Hitachi Data Systems; Oct. 2004; 20 pp.

(Continued)

*Primary Examiner*—Stephen C Elmore
*Assistant Examiner*—Mark A Giardino, Jr.

(57) ABSTRACT

In one embodiment, at least one characteristic of an ecosystem is monitored. The ecosystem includes i) a plurality of compute resources, and ii) a number of storage applications, wherein the number of storage applications are configured to use a plurality of storage access protocols. Which of the storage access protocols are implemented by which of the compute resources are tracked; and in response to the monitored characteristic(s) of the ecosystem being found unacceptable, an attempt is made to improve the monitored characteristic(s) by repurposing one or more of the compute resources to implement, or not implement, one of the storage access protocols.

39 Claims, 5 Drawing Sheets

OTHER PUBLICATIONS

Buchanan, et al.; "A New Look at Remote Data Replication for the Small-and Medium-Sized Enterprise"; Hitachi Data Systems; Jan. 2006; 17 pp.

Smalls, et al.; "Hitachi Application Optimized Storage(TM)"; Hitachi Data Systems; Nov. 2005; 18 pp.

"Hitachi HiCommand(R) Replication Monitor Software"; Hitachi Data Systems; Mar. 2005; 4 pp.

"Hitachi HiCommand (R) Tiered Storage Manager Software"; Hitachi Data Systems; Apr. 2006; 4 pp.

"3PAR Utility Storage Product Brief"; 3PARdata, Inc.; at least as early as 2002; 4 pp.

* cited by examiner

METHOD AND APPARATUS FOR REPURPOSING COMPUTE RESOURCES TO IMPLEMENT, OR NOT IMPLEMENT, STORAGE ACCESS PROTOCOLS

BACKGROUND

As the volume of data that is stored and accessed by a computer system or network increases, effective management of the system's storage capacity resources becomes increasingly important. Effective management of the compute resources (e.g., microprocessors) that are used to access the storage capacity resources also becomes increasingly important.

In the past, efforts to improve storage management have associated particular storage applications with particular storage capacity resources. For example, a storage application that is used to store/access new or frequently changed data might be associated with a first set of storage capacity resources, including one or more hard disks or random access memory (RAM) disks; a storage application that is used to backup data might be associated with a second set of storage capacity resources that include an additional one or more hard disks; and a storage application that is used to archive data might be associated with magnetic tape media, or a hard disk that is managed as magnetic tape media. A management system driven by computer-readable program code (e.g., firmware or software) may determine which storage applications are best associated with which storage capacity resources, and may reallocate or share storage capacity resources to/with different storage applications.

Efforts to improve storage management have also associated particular storage applications with particular compute resources. For example, a first set of compute resources might be allocated to support primary storage applications, such as those that are used to store/access new or frequently changed data; a second set of compute resources might be allocated to support secondary storage applications, such as those that are used to backup or archive data; and a third set of compute resources might be allocated to support tertiary storage applications, such as those that are generally used to archive data to removable or off-site media.

Despite the above efforts, additional and more effective ways to manage a system's storage and compute resources are desired.

BRIEF DESCRIPTION OF THE DRAWINGS

Illustrative embodiments of the invention are illustrated in the drawings, in which.

DETAILED DESCRIPTION

Figure 1:
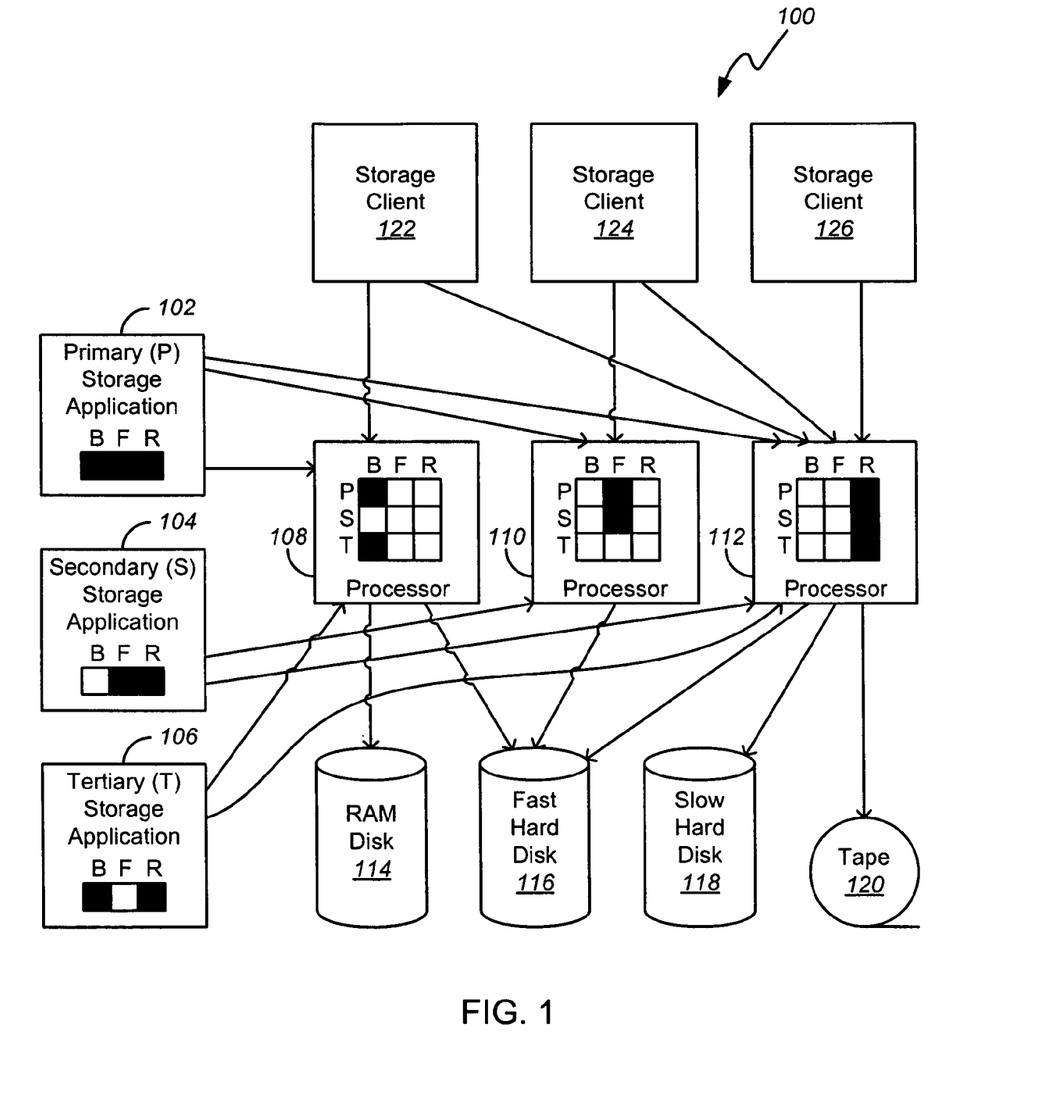
FIG. 1 illustrates an exemplary computer ecosystem.

FIG. 1 illustrates an exemplary computer ecosystem 100. The ecosystem 100 comprises a plurality of storage applications 102, 104, 106, a plurality of compute resources (e.g., microprocessors) 108, 110, 112, and a plurality of storage capacity resources 114, 116, 118, 120. The compute resources 108, 110, 112 may be pooled in various ways, and may be: integrated in a single system box, provided by multiple networked servers, or provided by multiple blades of a bladed server. The storage resources 114, 116, 118, 120 may variously comprise: one or more RAM disks, fast hard disks, slow hard disks, magnetic tapes or other forms of storage.

As illustrated by the arrows connecting ones of the storage applications 102, 104, 106, the compute resources 108, 110, 112, and the storage capacity resources 114, 116, 118, 120, each of the storage applications 102, 104, 106 may be supported by one or more of the compute resources 108, 110, 112, and may access one or more of the storage capacity resources 114, 116, 118, 120 via the compute resources 108, 110, 112. Alternate embodiments of the ecosystem 100 might comprise as few as one storage application and one storage capacity resource.

In the past, the management of storage compute resources 108, 110, 112 in an ecosystem 100 such as that which is shown in FIG. 1 has involved 1) associating particular storage applications 102, 104, 106 with particular compute resources 108, 110, 112, or 2) associating particular "types" of storage applications 102, 104, 106 with particular compute resources 108, 110, 112. Storage application types have sometimes included a hierarchical set of primary, secondary and tertiary application types, wherein: primary storage applications generally store/access new or frequently changed data; secondary storage applications generally backup or archive data; and tertiary storage applications generally archive data to removable or off-site media. In one embodiment, primary storage applications might access enterprise hard disks (e.g., SCSI, FC, SAS) or RAM disks; secondary storage applications might access enterprise or desktop (e.g., SATA) hard disks; and tertiary storage applications might access magnetic tape media, or desktop hard disks that are managed as magnetic tape media.

Figure 2:
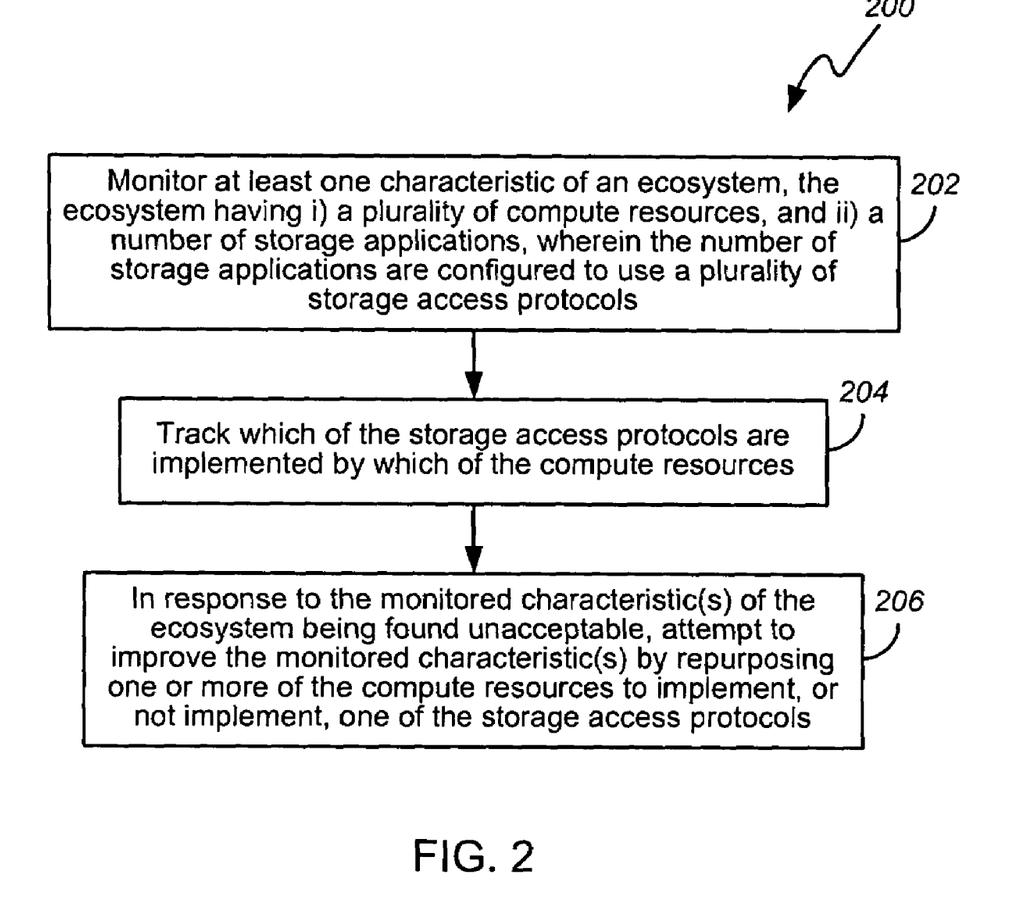
FIG. 2 illustrates a first exemplary method for managing storage compute resources.

FIG. 2 illustrates an exemplary new method 200 for managing storage compute resources 108, 110, 112 (FIG. 1). In accord with the method 200, at least one characteristic of a computer ecosystem 100 is monitored (at block 202). The monitored characteristic(s) may take various forms, and in one embodiment may comprise a real time characteristic, such as the real time performance or demand of one of the storage applications 102, 104, 106, or the real time performance or utilization of one of the compute resources 108, 110, 112. In some embodiments, the characteristic(s) may be monitored continuously, while in other embodiments, the characteristic(s) may be monitored periodically, upon the occurrence of a trigger event, or upon the request of an application or user.

As shown in FIG. 1, each of the storage applications 102, 104, 106 accesses the storage capacity resources 114, 116, 118, 120 (or is accessed by one or more of a number of storage clients 122, 124, 126) using one or more storage access protocols that are implemented by the compute resources 108, 110, 112. This is indicated, in part, by the application/protocol grids contained within each of the compute resources 108, 110, 112. The method 200 involves tracking which of these storage access protocols are implemented by which of the compute resources 108, 110, 112 (at block 204). Then, and if the monitored characteristic(s) of the ecosystem 100 are found to be unacceptable, the method 200 attempts to improve the monitored characteristic(s) by repurposing one or more of the compute resources 108, 110, 112 to implement, or not implement, one of the storage access protocols (at block 206). After repurposing a compute resource, one or more storage applications 102, 104, 106 may be associated or de-associated with the compute resource 108, 110, 112, thereby adding to, or detracting from, the storage application's support.

Figure 3:
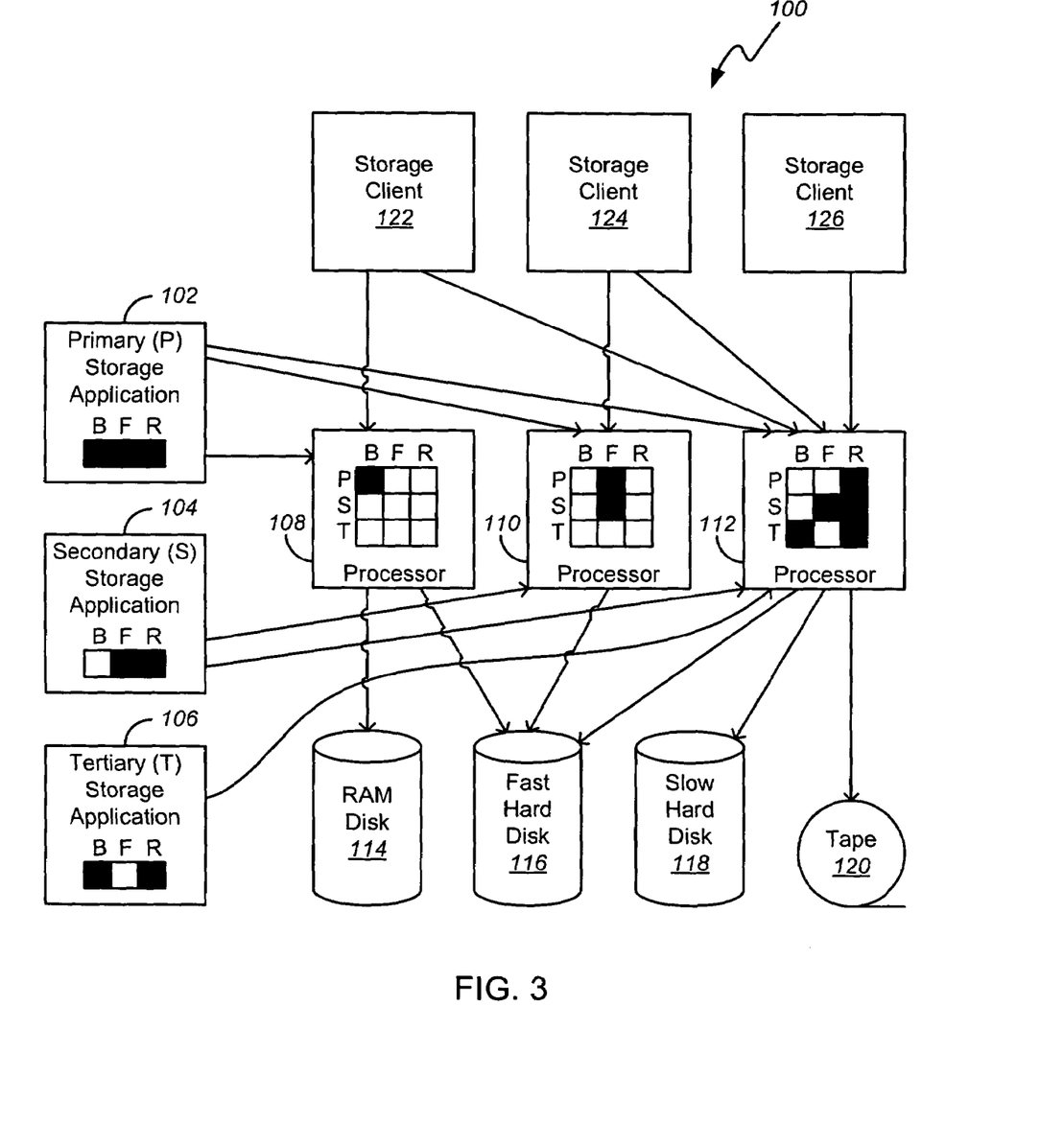
FIG. 3 illustrates the ecosystem of FIG. 1 after a repurposing of some of its compute resources.

An exemplary implementation of the method 200 is illustrated in FIGS. 1 and 3. As shown in FIG. 1, each of the storage applications 102, 104, 106 stores and accesses data using one or more of a number of storage access protocols. By way of example, the storage access protocols comprise a block access protocol (B), a file access protocol (F), and a reference access protocol (R). These access protocols may access files using the following commands and arguments:

```
Block Access Protocol:
    Read(Target, Logical Unit Number, Logical Block Address,
        Length in Blocks, Buffer)
    Write(Target, Logical Unit Number, Logical Block Address,
        Length in Blocks, Buffer)
File Access Protocol
    File Handle = Open(Volume, File Name)
    Read(File Handle, Byte Offset, Byte Length, Buffer)
    Write(File Handle, Byte Offset, Byte Length, Buffer)
Reference Access Protocol
    Search Result[ ] = Search(Data Set, Keywords[ ])
    Read(Search Result[x], Byte Offset, Byte Length, Buffer)
    Write(Search, Result[x], Byte Offset, Byte Length, Buffer)
```

Storage access protocols may also take other forms, such as a sequential access protocol that uses the following commands and arguments:

```
Sequential Access Protocol:
    Skip(Target, Drive Number, Number of File Marks)
    Rewind(Target, Drive Number)
    Read(Target, Drive Number, Length in Blocks or Bytes, Buffer)
    Write(Target, Drive Number, Length in Blocks or Bytes, Buffer)
```

It is noted that some of the storage applications shown in FIG. 1 access data using only one access protocol, while others access data using multiple access protocols. Likewise, some of the compute resources implement only one access protocol, while others implement multiple access protocols. Also, some compute resources may not implement any access protocol. Finally, each of the storage applications (via the compute resources) may access none, one, or multiple ones of the storage capacity resources.

If the monitored characteristic(s) of the ecosystem 100 are found to be unacceptable, the method 200 attempts to improve the monitored characteristic(s) by repurposing one or more of the compute resources 108, 110, 112 to implement, or not implement, one of the storage access protocols B, F or R. In addition to repurposing compute resources that are actively supporting storage applications, inactive compute resources may be activated, or active compute resources may be deactivated (e.g., to save cost if a user is paying for the use of additional compute resources). FIG. 3 illustrates the ecosystem 100 of FIG. 1 after one exemplary repurposing of the system's compute resources 108, 110, 112. In contrast to the configuration of compute resources 108, 110, 112 shown in FIG. 1, wherein each of the compute resources 108, 110, 112 implements only one access protocol, the compute resource 112 in FIG. 3 implements multiple access protocols.

Many factors and goals may determine how or which compute resources 108, 110, 112 are repurposed. In one embodiment, repurposing may be undertaken to adjust a ratio of support provided to two or more storage applications 102, 104, 106. This may include, for example, repurposing one or more compute resources 108, 110, 112 to adjust a ratio of support provided to ones of a hierarchical set of primary (P), secondary (S) and tertiary (T) storage applications 102, 104, 106.

In some cases, the ecosystem 100 may further comprise a number of user applications 402, 404 that are supported by the compute resources 108, 110, 112. See, for example, the ecosystem 400 shown in FIG. 4. In these cases, and in response to the monitored characteristic(s) of the ecosystem 400 being found unacceptable, attempts to improve the monitored characteristic(s) may be made by repurposing one or more compute resources 108, 110, 112 to adjust a ratio of support provided to 1) the user application(s) 402, 404, and 2) the storage application(s) 108, 110, 112. The compute resources 108, 110, 112 may also be repurposed to adjust the ratio of support provided to particular ones of the applications 102, 104, 106, 400, 402.

Figure 4:
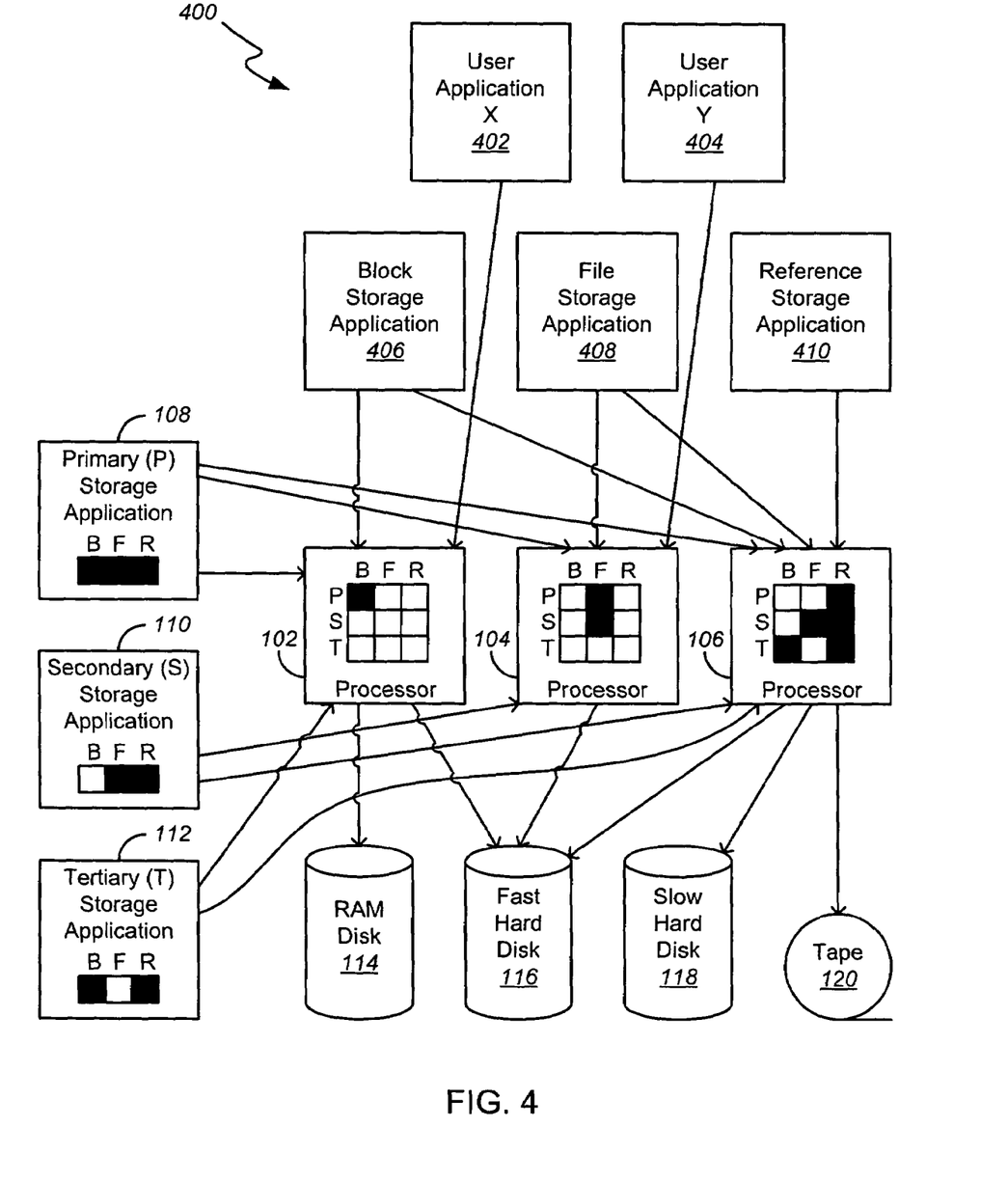
FIG. 4 illustrates a variation of the ecosystem shown in FIG. 1, wherein the ecosystem further comprises a number of user applications that are supported by the same compute resources a number of storage applications.

If an ecosystem 400 comprises user applications 400, 402, the monitored characteristic(s) of the ecosystem 400 may comprise the performance one or more of the user applications 402, 404.

FIG. 4 also illustrates that, in addition to comprising a hierarchical set of storage applications 102, 104, 106, an ecosystem 400 may comprise other types of storage applications 406, 408, 410, including storage applications 406, 408, 410 that solely implement storage access protocols and are controlled by, for example, other applications or operating systems.

Typically, the "repurposing" of compute resources 108, 110, 112 that is initiated by the method 200 is a logical repurposing. That is, the compute resources 108, 110, 112 remain physically connected in the same way and are merely assigned new tasks. However, in some cases, the repurposing may be a physical repurposing, such as the switching of a compute resource into or out of a processor group.

In some embodiments, the method 200 may be combined with other methods for managing compute or storage capacity resources 108, 110, 112, 114, 116, 118, 120. For example, the method 200 may be combined with methods that, in response to monitored characteristic(s) of an ecosystem 100 being found unacceptable, attempt to improve the monitored characteristic(s) by modifying at least one storage application's access to at least one storage capacity resource.

Figure 5:
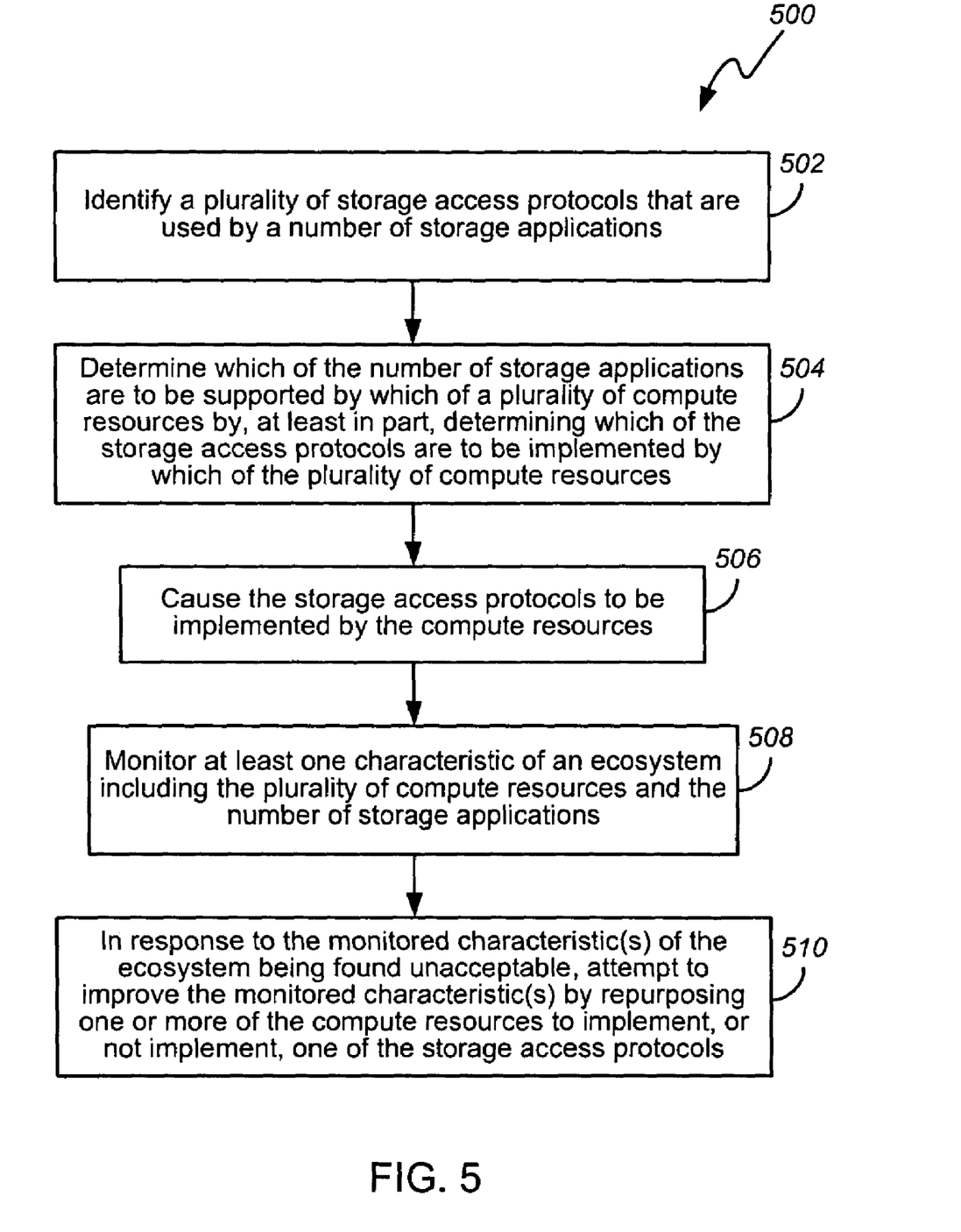
FIG. 5 illustrates a second exemplary method for managing storage compute resources.

FIG. 5 illustrates a method 500 that may be implemented upon boot or other initialization of an ecosystem 100 (FIG. 1). The method 500 comprises identifying a plurality of storage access protocols that are used by a number of storage applications 102, 104, 106 (e.g., when being accessed by a number of storage clients, or when accessing a number of storage capacity resources 114, 116, 118, 120). See block 502. The method 500 then 1) determines which of the storage applications 102, 104, 106 are to be supported by which of a plurality of compute resources 108, 110, 112 by, at least in part, determining which of the storage access protocols are to be implemented by which of the plurality of compute resources 108, 110, 112, and 2) causes the storage access protocols to be implemented by the compute resources 108, 110, 112. See blocks 504 and 506. Thereafter, at least one characteristic of the ecosystem 100 that includes the plurality of compute resources 108, 110, 112 and number of storage applications 102, 104, 106 is monitored (at block 508), and in response to the monitored characteristic(s) of the ecosystem 100 being found unacceptable, an attempt to improve the monitored characteristic(s) is made by repurposing one or more of the compute resources 108, 110, 112 to implement, or not implement, one of the storage access protocols (at block 510).

If the method 200 or 500 is applied to an ecosystem 100 in which the elements of the ecosystem 100 are unknown, the method 200 or 500 may comprise discovering the ecosystem's elements. This may be accomplished, for example, by parsing operating system files, including a registry file, or by initiating identification queries over one or more busses or threads.

The methods 200 and 500 may be implemented by means of computer-readable code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable media may also comprise one or more of the storage capacity resources 114, 116, 118, 120 shown in FIG. 1. The computer-readable code will typically comprise software, but could also comprise firmware or a programmed circuit. Also, the computer-readable code may be executed by one or more of the compute resources 108, 110, 112 that are used to access a system's storage capacity resources 114, 116, 118, 120, or by other compute resources.

In some embodiments, the code used to implement the method 200 or 500 may comprise code to generate a graphical user interface (GUI) for display to a user. The GUI may convey to a user which storage access protocols correspond to which compute resources 108, 110, 112. The GUI may also (or alternately) convey a correspondence of storage applications 102, 104, 106 to compute resources 108, 110, 112, a correspondence of storage applications 102, 104, 106 to storage capacity resources 114, 116, 118, 120, or other information. The information displayed by the GUI may take various forms, but in one embodiment, may comprise graphical elements such as those which are shown in FIG. 1, 3 or 4.

What is claimed is:

1. Apparatus, comprising:
   computer-readable media; and
   computer-readable code, stored on the computer-readable media, including:
      code to monitor at least one characteristic of an ecosystem, the ecosystem having i) a plurality of compute resources, and ii) a number of storage applications, wherein the number of storage applications are configured to use a plurality of storage access protocols;
      code to track which of the storage access protocols are implemented by which of the compute resources; and
      code to, in response to the monitored characteristic(s) of the ecosystem being found unacceptable, repurpose one or more of the compute resources to activate or deactivate one of the storage access protocols.

2. The apparatus of claim 1, wherein the computer-readable code further comprises code to discover elements of the ecosystem, including the compute resources and the storage applications.

3. The apparatus of claim 1, wherein:
   the ecosystem further includes a number of user applications; and
   the computer-readable code further comprises code to, in response to the monitored characteristic(s) of the ecosystem being found unacceptable, adjust a ratio of support provided to the user application(s) and the storage application(s).

4. The apparatus of claim 3, wherein the monitored characteristic(s) of the ecosystem comprise performance of at least one of the user applications.

5. The apparatus of claim 1, wherein the monitored characteristic(s) of the ecosystem comprise at least one real time characteristic.

6. The apparatus of claim 1, wherein the monitored characteristic(s) of the ecosystem comprise performance of at least one of the storage applications.

7. The apparatus of claim 1, wherein the monitored characteristic(s) of the ecosystem comprise utilization of at least one of the compute resources.

8. The apparatus of claim 1, wherein the code to repurpose one or more of the compute resources undertakes said repurposing to adjust a ratio of support provided to two or more of the storage applications.

9. The apparatus of claim 8, wherein the repurposing of the one or more compute resources is a logical repurposing.

10. The apparatus of claim 1, wherein the computer-readable code further comprises code to generate a graphical user interface (GUI) for display to a user, the GUI conveying to the user a correspondence of said storage access protocols to said compute resources.

11. The apparatus of claim 1, wherein the computer-readable code further comprises code to generate a graphical user interface (GUI) for display to a user, the GUI conveying to the user a correspondence of said storage applications to said compute resources.

12. The apparatus of claim 1, wherein the computer-readable code further comprises code to generate a graphical user interface (GUI) for display to a user, the GUI conveying to the user a correspondence of said storage applications to a plurality of storage capacity resources.

13. The apparatus of claim 1, wherein:
   the ecosystem further includes a plurality of storage capacity resources; and
   the computer-readable code further comprises code to, in response to the monitored characteristic(s) of the ecosystem being found unacceptable, modify at least one of the storage application's access to at least one of the storage capacity resources.

14. The apparatus of claim 1, wherein:
   the storage applications comprise a hierarchical set of primary, secondary and tertiary storage applications; and
   the code to repurpose one or more of the compute resources adjusts a ratio of support provided to the primary, secondary and tertiary storage applications.

15. The apparatus of claim 1, wherein the storage access protocols used by the storage applications comprise protocols for accessing storage capacity resources.

16. The apparatus of claim 1, wherein the storage access protocols used by the storage applications comprise protocols for being accessed by a plurality of storage clients.

17. Apparatus, comprising:
   computer-readable media; and
   computer-readable code, stored on the computer-readable media, comprising:
      code to identify a plurality of storage access protocols that are used by a number of storage applications;
      code to i) determine which of the number of storage applications are to be supported by which of a plurality of compute resources by, at least in part, determining which of the storage access protocols are to be implemented by which of the plurality of compute resources, and ii) cause the storage access protocols to be implemented by the compute resources;
      code to monitor at least one characteristic of an ecosystem including the plurality of compute resources and the number of storage applications; and code to, in response to the monitored characteristic(s) of the ecosystem being found unacceptable, repurpose one or more of the compute resources activate or deactivate, one of the storage access protocols.

18. The apparatus of claim 17, wherein:
the ecosystem further includes a number of user applications; and
the computer-readable code further comprises code to, in response to the monitored characteristic(s) of the ecosystem being found unacceptable, adjust a ratio of support provided to the user application(s) and the storage application(s).

19. The apparatus of claim 17, wherein:
the ecosystem further includes a plurality of storage capacity resources; and
the computer-readable code further comprises code to, modify at least one of the storage application's access to at least one of the storage capacity resources.

20. The apparatus of claim 17, wherein:
the storage applications comprise a hierarchical set of primary, secondary and tertiary storage applications; and
the code adjusts a ratio of support provided to the primary, secondary and tertiary storage applications.

21. A method, comprising:
monitoring at least one characteristic of an ecosystem, the ecosystem having i) a plurality of compute resources, and ii) a number of storage applications, wherein the number of storage applications are configured to use a plurality of storage access protocols;
tracking which of the storage access protocols are implemented by which of the compute resources; and
in response to the monitored characteristic(s) of the ecosystem being found unacceptable, repurposing one or more of the compute resources to activate or deactivate one of the storage access protocols.

22. The method of claim 21, wherein the ecosystem further includes a number of user applications, the method further comprising:
in response to the monitored characteristic(s) of the ecosystem being found unacceptable, adjusting a ratio of support provided to the user application(s) and the storage application(s).

23. The method of claim 22, wherein the monitored characteristic(s) of the ecosystem comprise performance of at least one of the user applications.

24. The method of claim 21, wherein the monitored characteristic(s) of the ecosystem comprise at least one real time characteristic.

25. The method of claim 21, wherein the monitored characteristic(s) of the ecosystem comprise performance of at least one of the storage applications.

26. The method of claim 21, wherein the monitored characteristic(s) of the ecosystem comprise utilization of at least one of the compute resources.

27. The method of claim 21, wherein the repurposing of the one or more compute resources is undertaken to adjust a ratio of support provided to two or more of the storage applications.

28. The method of claim 27, wherein the repurposing of the one or more compute resources is a logical repurposing.

29. The method of claim 21, wherein the ecosystem further includes a plurality of storage capacity resources, the method further comprising:
in response to the monitored characteristic(s) of the ecosystem being found unacceptable, modifying at least one of the storage application's access to at least one of the storage capacity resources.

30. The method of claim 21, wherein:
the storage applications comprise a hierarchical set of primary, secondary and tertiary storage applications; and
the repurposing of the one or more compute resources is undertaken to adjust a ratio of support provided to the primary, secondary and tertiary storage applications.

31. A method, comprising:
identifying a plurality of storage access protocols that are used by a number of storage applications;
determining which of the number of storage applications are to be supported by which of a plurality of compute resources by, at least in part, determining which of the storage access protocols are to be implemented by which of the plurality of compute resources;
causing the storage access protocols to be implemented by the compute resources;
monitoring at least one characteristic of an ecosystem including the plurality of compute resources and the number of storage applications; and
in response to the monitored characteristic(s) of the ecosystem being found unacceptable, repurposing one or more of the compute resources to activate or deactivate one of the storage access protocols.

32. The apparatus of claim 1, wherein the plurality of storage access protocols comprise:
at least one block access protocol;
at least one file access protocol; and
at least one reference access protocol.

33. The apparatus of claim 1, wherein:
the number of storage applications comprises a hierarchical set of primary, secondary, and tertiary storage applications;
the primary storage application accesses an enterprise hard disk;
the secondary storage application accesses a desk top hard disk; and
the tertiary storage application accesses a magnetic tape media.

34. The apparatus of claim 17, wherein the plurality of storage access protocols comprise:
at least one block access protocol;
at least one file access protocol; and
at least one reference access protocol.

35. The apparatus of claim 17, wherein:
the number of storage applications comprises a hierarchical set of primary, secondary, and tertiary storage applications;
the primary storage application accesses an enterprise hard disk;
the secondary storage application accesses a desk top hard disk; and
the tertiary storage application accesses a magnetic tape media.

36. The method of claim 21, wherein the plurality of storage access protocols comprise:
at least one block access protocol;
at least one file access protocol; and
at least one reference access protocol.

37. The apparatus of claim 21, wherein:
the number of storage applications comprises a hierarchical set of primary, secondary, and tertiary storage applications;

the primary storage application accesses an enterprise hard disk;

the secondary storage application accesses a desk top hard disk; and the tertiary storage application accesses a magnetic tape media.

38. The apparatus of claim 31, wherein the plurality of storage access protocols comprise:
- at least one block access protocol;
- at least one file access protocol; and
- at least one reference access protocol.

39. The apparatus of claim 31, wherein:

the number of storage applications comprises a hierarchical set of primary, secondary, and tertiary storage applications;

the primary storage application accesses an enterprise hard disk; the secondary storage application accesses a desk top hard disk; and the tertiary storage application accesses a magnetic tape media.

* * * * *

UNITED STATES PATENT AND TRADEMARK OFFICE
CERTIFICATE OF CORRECTION

| | |
|---|---|
| PATENT NO. | : 7,543,128 B2 |
| APPLICATION NO. | : 11/493389 |
| DATED | : June 2, 2009 |
| INVENTOR(S) | : Harold Woods et al. |

It is certified that error appears in the above-identified patent and that said Letters Patent is hereby corrected as shown below:

In column 7, line 3, in Claim 17, after "resources" insert -- to --.

Signed and Sealed this

Twenty-second Day of December, 2009

David J. Kappos
*Director of the United States Patent and Trademark Office*